3,217,027
PURIFICATION OF CYANOALIPHATIC ACIDS
John C. Little, Midland, Mich., assignor to The Dow Chemical Company, Midland, Mich., a corporation of Delaware
No Drawing. Filed Nov. 2, 1961, Ser. No. 149,505
7 Claims. (Cl. 260—465.4)

This invention relates to a method for separating omega-cyanoaliphatic carboxylic acids from the corresponding dicarboxylic acids. It relates particularly to the separation of the mixed acids as contained in certain reaction mixtures.

The reactions whereby the ammonium salt of a carboxylic acid is converted by successive dehydrations to the corresponding nitrile by way of the amide are old and well known. These general reactions have been applied specifically to the preparation of omega-cyanoacids by the reaction under dehydrating conditions of the corresponding dicarboxylic acids with ammonia. Under these conditions, there are obtained reaction mixtures which contain not only the dicarboxylic and the cyano acids and possibly their ammonium salts but also other products and by-products such as water, diamides, cyanoamides, imides, dinitriles, and sometimes cyclic ketones formed by decarboxylation of the dibasic acid.

The separation of the desired cyanoacid from such a mixture presents a difficult problem. Fractional distillation is unsatisfactory because high vacuum is required and because the cyanoacids are unstable at the high temperatures necessary for distillation even under high vacuum. Related compounds present in the reaction mixture also tend to decompose during such distillation. Procedures involving extraction from aqueous solutions are even less satisfactory because the highly polar nature of the cyanoacids makes them very difficult to remove from water. Undesirable solvents such as ethyl ether are necessary for reasonable extraction efficiencies and hydrolysis of the nitrile groups present is likely to occur during the process. Procedures based on selective extraction solvents are disadvantageous because of the close similarity in structure and properties of some of the components of the mixture. Particularly difficult is the separation of the cyanoacid from the starting dicarboxylic acid. Similarly, fractional crystallization is also inefficient as a separation method.

It has now been found that omega-cyanoacids having the formula $NC-(CH_2)_n-CO_2H$ wherein $n$ is an integer from about three to about nine are easily and efficiently separated from the corresponding dibasic acid in particular and from the above described reaction mixtures in general by a process which includes forming a substantially anhydrous solution of the reaction mixture in an inert organic solvent, adding to this solution at least about one mole of ammonia per mole of free dibasic acid present, heating the solution to about 35–110° C., and separating the precipitated ammonium salt of the dibasic acid. It has been found that under these conditions, the ammonium salt of the cyanoacid or the acid itself, whichever may be present, remains in solution while the dibasic acid forms a stable and insoluble ammonium salt which is essentially completely precipitated.

The dibasic acid component once having been removed from the reaction mixture solution, the cyanoacid product can then be separated by conventional methods for separating an acid from non-acidic impurities. A convenient and clean separation is accomplished by adding to the mother liquor at least about one mole of ammonia per mole of free cyanoacid present and cooling the ammoniated solution to a temperature below about 30° C. but above its freezing point, whereupon the ammonium salt of the cyanoacid is efficiently precipitated from solution in easily handled crystalline form.

The key step in the process is, therefore, the separation of the ammonium salt of the dibasic acid from the reaction mixture under conditions which cause the cyanoacid to remain in solution. This is based on the discovery that the ammonium salts of these cyanoacids are either remarkably solubilized or are unstable and decompose to the soluble free acid and ammonia at temperatures above about 35° C. while the ammonium salts of the corresponding dibasic acids are insoluble and stable at temperatures up to about 110° C. Accordingly, the essential separation in this process is accomplished by forming the ammonium salt of the dibasic acid in a suitable solution of the mixture and rmoving that salt at about 35–110° C. The cyanoacid can then be separated from the remaining solution as its ammonium salt which is stable and insoluble at lower temperatures.

The process requires a solvent which is inert, that is, unreactive with the compounds which are found in the reaction mixtures described, and one which has the necessary solubility characteristics. Preferably, the solvent used has a boiling point within the range of process temperatures and forms an azeotrope with water to facilitate the necessary formation of a substantially anhydrous solution. Organic solvents such as cycloaliphatic hydrocarbons, aromatic hydrocarbons, chlorinated aliphatic and aromatic hydrocarbons, cyclic ethers, aliphatic ethers, ketones, and esters are operable in the process. Representative examples includes cyclohexane, benzene, toluene, chlorobenzene, methylene chloride, chloroform, carbon tetrachloride, methylchloroform, trichloroethylene, dioxane, tetrahydrofuran, dibutyl ether, ethylene glycol dimethyl ether, acetone, methyl isobutyl ketone, cyclohexanone, ethyl acetate, methyl benzoate, and similar materials.

The quantity of solvent to be used is not critical as from very dilute to saturated solutions of the mixture may be used in the process. Preferred concentrations are 10–200 grams of mixture per liter of solvent.

After the removal of water from the reaction mixture solution, ammonia is added as necessary to form ammonium salts of the acids present. In the first ammoniation, which may be done at any temperature between the freezing and boiling points of the solution but is preferably done at about 45° to about 65° C., ammonia is added in a quantity at least equimolar with the free dibasic acid present in solution and up to that sufficient to form a saturated solution. Preferably, an excess of ammonia of from 0.1 to 2 molar equivalents is used, based on the dibasic acid present. After the dibasic acid has been removed from the mixture, more ammonia may be added to the remaining solution to insure complete neutralization of the cyanoacid. This second ammoniation may be done, where it is necessary, at the same temperatures and with similar quantities of ammonia. Preferably, an excess of 0.1 to 3 molar equivalents of ammonia is used based on the free cyanoacid present.

The filtration of the precipitated ammonium salt of the dibasic acid, which is usually the monoammonium salt, may be done between about 35° C. and about 110° C. and is preferably done at 45–65° C. The precipitate may also contain the diammonium salt and some of the free acid itself, depending upon the particular dibasic acid and the temperature and the solvent being employed. Below 35° C., the ammonium salt of the cyanoacid may also precipitate, particularly if excess ammonia is present. Above about 110° C., the dibasic acid ammonium salt begins to decompose to ammonia and the soluble free acid, rendering effective separation impossible.

The ammonium salt of the cyanoacid may be separated by filtration in the last step of the process at a temperature between the freezing point of the solution and about 30° C. The preferred temperature for this step is 5–20° C. Above about 30° C., the solubility of the cyanoacid salt is too great for practical separation.

While this process is normally and most conveniently operated at atmospheric pressure, lower or higher pressures may be employed, for example, to aid in ammonia saturation or to change the boiling point of the solution, so long as the necessary conditions set forth above are used.

The following examples illustrate ways in which my invention may be employed but are not to be construed as necessarily delimiting its scope.

*Example 1*

A mixture of 9.3 g. of pimelic acid, 10.0 g. of pimelonitrile, and 10 g. of 6-cyanohexanoic acid was dissolved in 1 liter of dry chloroform and the solution was saturated at its boiling point with anhydrous ammonia. Filtration of the boiling solution yielded 10.3 g. of monoammonium pimelate, the theoretical quantity. The filtrate was cooled to 10° C., saturated at this temperature with dry ammonia, and filtered to yield 7.6 g. of precipitated ammonium 6-cyanohexanoate. Concentration of the filtrate to 250 ml. and addition of more ammonia at 10° C. yielded an additional 2.8 g. of ammonium 6-cyanohexanoate for a total recovery of 93% of the original cyanoacid content as the ammonium salt. Elemental analysis of both recovered salts indicated that they were the essentially pure compounds as obtained from the process. Concentration of the chloroform mother liquor produced 11.3 g. of an oil which was about 90% pimelonitrile, the balance being 6-cyanohexanoic acid.

*Example 2*

A known mixture consisting of 15 g. of pimelic acid, 15 g. of monoammonium pimelate, 40 g. of ammonium 6-cyanohexanoate, 25 g. of pimelonitrile, 5.0 g. of cyclohexanone, and 20 ml. of water was suspended in 4.5 liters of chloroform. The water was removed as its azeotrope with chloroform and the solution was then allowed to cool to about 50° C. Anhydrous ammonia in excess of the free acid present was added and the mixture was refluxed for 15 minutes. The white solid which precipitated from the solution was separated by filtration of the hot solution. It was found to consist of 31.2 g. of monoammonium pimelate and 7.9 g. of entrained ammonium 6-cyanohexanoate. The latter material was removed as the free acid by suspending the mixture in 3 liters of chloroform, refluxing the suspension for 15 minutes, and filtering it while hot. The two compounds were thereby completely separated, the 6-cyanohexanoic acid appearing in the filtrate while the monoammonium pimelate remained undissolved. Spectroscopic examination of the purified pimelate salt showed the presence of no cyano group.

The mother liquor from the first hot filtration was warmed to 50° C. and anhydrous ammonia in excess of the acid present was added. The solution was then cooled to 5° C., whereupon 31.9 g. of essentially pure ammonium 6-cyanohexanoate crystallized and was separated by filtering.

*Example 3*

A mixture of 50 g. of pimelamide and 1 g. of phosphoric acid was stirred at 250–260° C. for one hour and then subjected to vacuum distillation at a pot temperature of at least 250° C. A total of 40.4 g. of distillate was collected, leaving 6.5 g. of brown resinous residue. The distillate was suspended in 1.5 liters of chloroform and the water present was removed by azeotropic distillation. After dilution to the original volume with fresh dry chloroform, the solution was saturated with ammonia at 50–60° C. A white precipitate of 3.0 g. of monoammonium pimelate was separated by filtration of the hot mixture. The filtrate was cooled to 5° C. and ammonia was again passed into the solution, precipitating 18.5 g. of ammonium 6-cyanohexanoate. Concentration of the mother liquor yielded 21 g. of brown oil which was found to contain 1.3 g. of 6-cyanohexanoic acid, 14.1 g. of pimelonitrile, and 4.6 g. of 6-cyanohexanamide.

*Example 4*

Upon treatment in the manner of Example 3 of a mixture of 50 g. of pimelamide, 12.7 g. of pimelic acid, and 1 g. of phosphoric acid, 50.9 g. of distillate and 7.5 g. of residue were obtained. The separation procedure of Example 3 was applied to the volatile portion, yielding 5.2 g. of monoammonium pimelate, 22.0 g. of ammonium 6-cyanohexanoate, and 22.5 g. of a fraction which contained 1.5 g. of 6-cyanohexanoic acid, 17.3 g. of pimelonitrile, and 2.9 g. of 6-cyanohexanamide.

*Example 5*

To 3710 ml. of chloroform was added 464 g. of a reaction mixture containing approximately 27 mole percent of pimelic acid and ammonium pimelate, 55 mole percent of 6-cyanohexanoic acid, and other materials including 6-cyanohexanamide, pimelonitrile, and water. This mixture was refluxed through a water separator to remove most of the water, then ammonia was added to the system at 50° C. until absorption slowed markedly. The mixture was then heated to reflux temperature to remove excess ammonia and it was filtered while hot. The filter cake was washed with hot chloroform and dried, yielding 117 g. of monoammonium pimelate. The warm filtrate from the original separation was saturated with ammonia at 50° C. and cooled to 10° C. Filtration of the cold mixture yielded 259 g. of solid crude ammonium 6-cyanohexanoate containing a total of about 5% ammonium pimelate and 6-cyanohexanamide. The impurities were removed from this crude material by repeating the above procedure.

*Example 6*

To 2870 ml. of chloroform there was added 472 g. of the reaction mixture described in Example 5. By the separation procedure of Example 5, there was obtained 119 g. of monoammonium pimelate, 5 g. of 6-cyanohexanoic acid from the wash liquors, and 264 g. of crude ammonium 6-cyanohexanoate containing about 6 percent by weight of ammonium pimelate and about 3 percent of 6-cyanohexanamide. These impurities were removed by subjecting the crude product to essentially the same purification procedure.

*Example 7*

A mixture of 0.8 g. of 5-cyanovaleric acid and 0.8 g. of adipic acid was suspended in 200 ml. of chloroform. The suspension was heated at reflux temperature for 20 minutes while a slow stream of ammonia was bubbled through the boiling liquid. The suspension was filtered hot to separate 0.6 g. of white powder which was found to consist of about 62 percent of adipic acid and 38 percent of monoammonium adipate. The filtrate was cooled to 9° C. and saturated with ammonia. A white solid precipitated and was separated by filtration. It was dried and suspended in 100 ml. of hot chloroform. Chloroform was evaporated from this hot suspension until very little ammonia could be detected in the vapors. Dilution to 100 ml. with chloroform and filtration at 50–60° C. separated 0.2 g. of solid ammonium adipate. The filtrate was cooled to 20° C. and contacted with ammonia while cooling was continued to 7° C. The thereby precipitated white solid was separated and found to be ammonium 5-cyanovalerate, weight 0.6 g. Evaporation of the mother liquors yielded 0.2 g. of free 5-cyanovaleric acid as a colorless oil.

By the general procedure described in the foregoing examples, other omega-cyanoacids of the general formula shown are conveniently and efficiently separated from the corresponding dibasic acids. For example, 4-cyanobutyric acid and glutaric acid, 7-cyanoheptanoic acid and suberic acid, 8-cyanoaprylic acid and azelaic acid, 9-cyanopelargonic acid and sebacic acid, and 10-cyanocapric acid and 1,11-undeanedioic acid are similarly separated by this process.

Although only chloroform is used as the process solvent in the specific examples above, other solvents of the classes previously named may be used to give similar results. These solvents include benzene, chlorobenzene, toluene, xylene, cyclohexane, methylene chloride, carbon tetrachloride, methylchloroform, trichloroethylene, dioxane, tetrahydrofuran, dibutyl ether, ethylene glycol dimethyl ether, acetone, methyl ethyl ketone, methyl isobutyl ketone, cyclohexanone, ethyl acetate, methyl benzoate, and others of similar nature.

I claim:

1. A process for separating a cyanoacid having the formula $NC-(CH_2)_n-CO_2H$ wherein $n$ is an integer from about three to about nine from the corresponding dicarboxylic acid which comprises forming a substantially anhydrous solution of the mixed acids in an inert organic solvent, adding to said solution at least about one mole of ammonia per mole of free dicarboxylic acid, adjusting the temperature of said solution to about 35° C. to about 110° C., thereby forming a mother liquor and a precipitated ammonium salt of the dicarboxylic acid, and removing said precipitated salt from said mother liquor.

2. The process of claim 1 wherein at least about one mole of ammonia per mole of free cyanoacid is added to the mother liquor from the separation of the dicarboxylic acid ammonium salt, the ammoniated mother liquor is cooled to a temperature between its freezing point and about 30° C., and the thereby precipitated ammonium salt of the cyanoacid is separated therefrom.

3. A process for separating a cyanoacid having the formula $NC-(CH_2)_n-CO_2H$ wherein $n$ is an integer from about three to about nine from the corresponding dicarboxylic acid as contained in a reaction mixture obtained by reacting ammonia and said dicarboxylic acid under dehydrating conditions, which process comprises forming a substantially anhydrous solution of said reaction mixture in an inert organic solvent, adding to said solution at least about one mole of ammonia per mole of free dicarboxylic acid, adjusting the temperature of said solution to about 35° C. to about 110° C., thereby forming a mother liquor and a precipitated ammonium salt of the dicarboxylic acid, and removing said precipitated salt from said mother liquor.

4. The process of claim 3 wherein at least about one mole of ammonia per mole of free cyanoacid is added to the mother liquor from the separation of the dicarboxylic acid ammonium salt, the ammoniated mother liquor is cooled to a temperature between its freezing point and about 30° C., and the thereby precipitated ammonium salt of the cyanoacid is separated therefrom.

5. The process of claim 3 wherein the cyanoacid is 6-cyanohexanoic acid and the dicarboxylic acid is pimelic acid.

6. The process of claim 4 wherein the cyanoacid is 6-cyanohexanoic acid and the dicarboxylic acid is pimelic acid.

7. A process for separating a cyanoacid having the formula $NC-(CH_2)_n-CO_2H$ wherein $n$ is an integer from about three to about nine from the corresponding dicarboxylic acid which comprises forming a substantially anhydrous mixture at about 35° C. to about 110° C. of the mixed acids with an inert organic solvent and at least about one mole of ammonia per mole of dicarboxylic acid, said solvent being in sufficient amount to dissolve the cyanoacid and at least a substantial part of the dicarboxylic acid, thereby forming a mother liquor and a precipitated ammonium salt of the dicarboxylic acid, and removing said precipitated salt from said mother liquor.

References Cited by the Examiner

UNITED STATES PATENTS 2,132,849   10/38   Greenewalt et al. ____ 260—465.2

CHARLES B. PARKER, *Primary Examiner.*